Oct. 7, 1969  W. S. DOLAN  3,471,029
INSTRUMENT MOUNTING SYSTEM
Filed Aug. 29, 1967  2 Sheets-Sheet 1
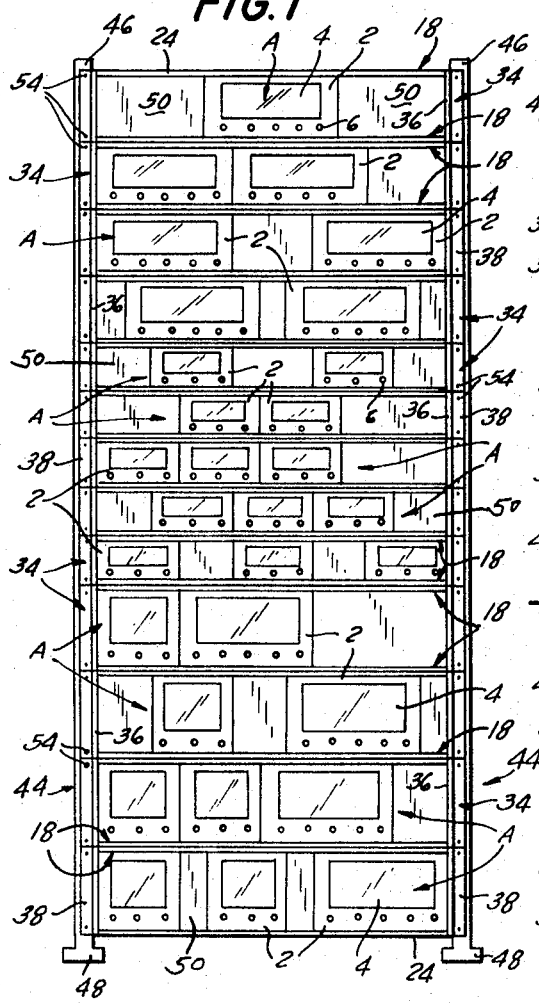
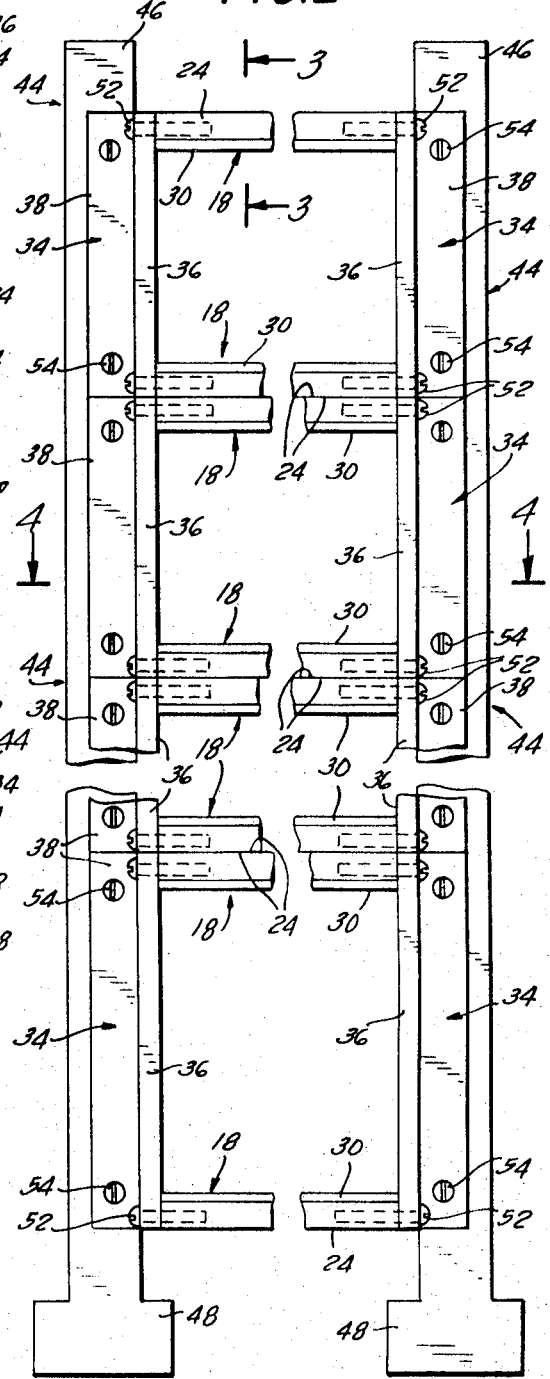
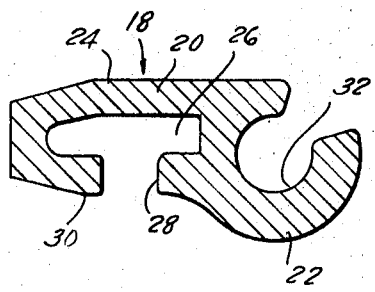
INVENTOR
WILLIAM S. DOLAN
BY
ATTORNEYS Oct. 7, 1969  W. S. DOLAN  3,471,029
INSTRUMENT MOUNTING SYSTEM
Filed Aug. 29, 1967  2 Sheets-Sheet 2
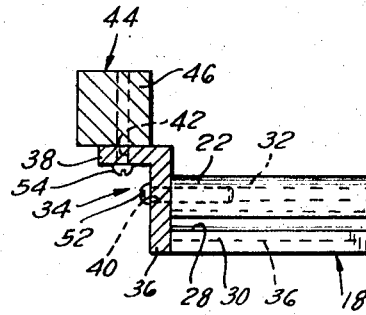
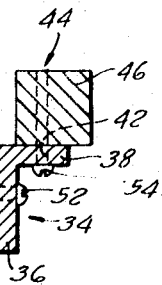
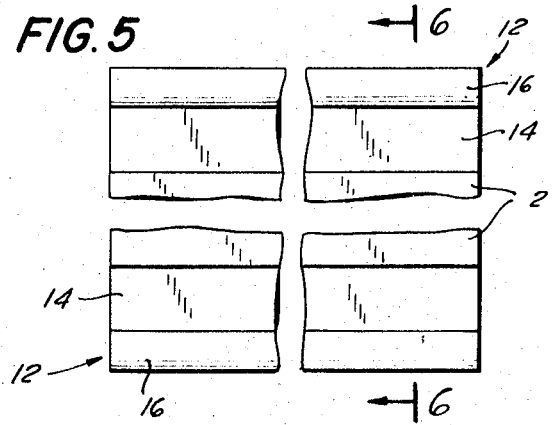
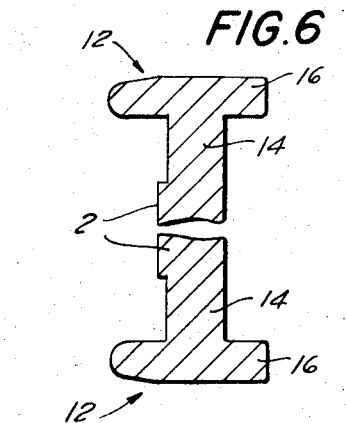
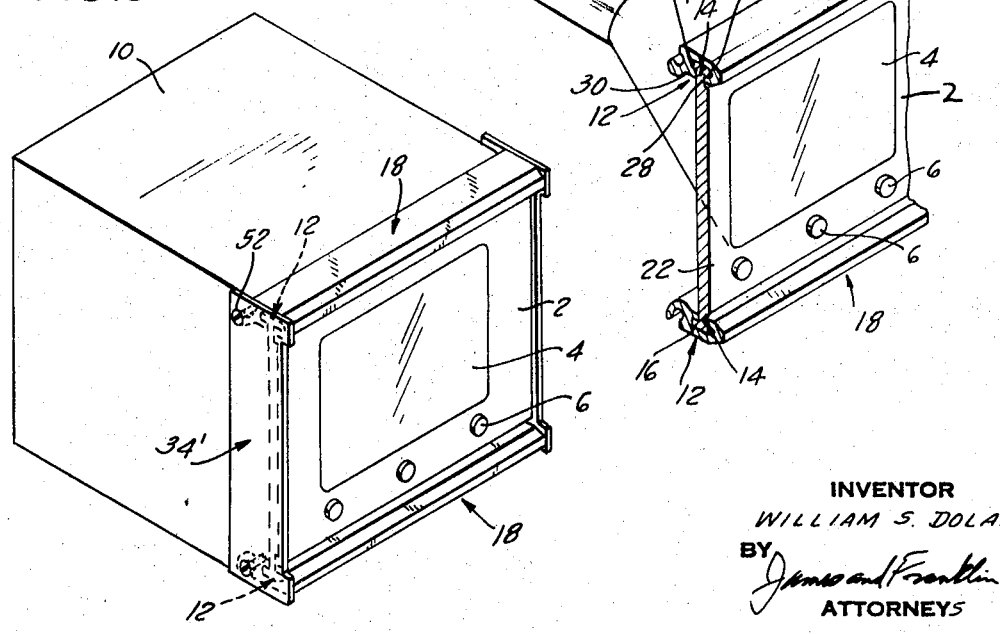
INVENTOR
WILLIAM S. DOLAN
BY
ATTORNEYS United States Patent Office 3,471,029
Patented Oct. 7, 1969

3,471,029
INSTRUMENT MOUNTING SYSTEM
William S. Dolan, Woodbury, Conn., assignor, by mesne assignments, to Spedcor Electronics, Inc., a corporation of New York
Filed Aug. 29, 1967, Ser. No. 664,113
Int. Cl. A47f 7/00; A47b 81/06
U.S. Cl. 211—13
14 Claims

ABSTRACT OF THE DISCLOSURE

A mounting system for instruments and the like which permits the said instruments to be located in different positions, and to be shifted from one position to another, through the use of standardized mounting members; the instrument front walls are provided with elements extending therefrom which are slidably received in elongated open-ended recesses formed in vertically spaced mounting rails, the open ends of those recesses being closed by plates which also serve to secure the rails with the instrument assemblies mounted thereon to any suitable support means; the plates are secured to the rails by securing elements which enter apertures formed in the ends of the rails.

---

The present invention relates to means for facilitating the mounting of instruments on support means and for permitting the instruments to be arranged and positioned in virtually any position or combination of positions desired, all through the use of standardized mounting structure.

There are many occasions when a plurality of instruments are to be mounted one beside the other in a particular panel arrangement. The optimum arrangement of instruments may vary from one industrial application to another, depending upon the particular task to be accomplished. Thus in a testing laboratory different numbers of instruments performing different tasks will be required for different testing operations, and in each instance certain instruments are best grouped with other instruments where their indications or control effects are to be correlated or compared. In industrial monitoring different instruments, and different combinations of instruments, may be required depending upon the particular industrial process which is to be monitored. In industrial control applications certain indicating instruments should be closely spaced relative to certain control instruments so that appropriate action can be taken upon the detection of a given phenomenon, and the particular measurements and controls will vary from one application to another.

It is customary to mount the applicable instruments so as to define a panel, usually but not necessarily vertical. The panel usually comprises a wall on which the various instruments are mounted, usually by being secured to the rear face of that wall, with openings being cut or otherwise formed in the wall so as to provide physical and visual access to the instruments mounted thereon. It therefore is necessary, once the particular combination and arrangement of instruments for a given application has been decided upon, to fabricate the panel wall for that arrangement and to thereafter secure the instruments in their proper places. Thus a separate panel-wall-forming operation is required for each panel. Moreover, once a given panel wall has been conditioned for a particular arrangement it cannot be used for any other arrangement, since the apertures which have been formed therein are peculiar to the first arrangement. Thus if a new testing, supervisory or control operation is to be performed, a completely new panel wall must be formed, and the old panel wall must be discarded.

Not only does the prior art panel mounting arrangement require a specially fabricated panel wall for each combination of instruments, but individual attachment of the instruments to that panel wall by screwing or the like is involved, a time consuming and hence costly operation. Because each panel wall in the prior art had to be tailored to a particular installation, no advantage could be taken of quantity production techniques, thus further appreciably increasing installation costs.

Instruments such as oscilloscopes are generally manufactured with a front wall having flanges extending beyond the indicating and control face thereof which are provided with holes through which screws or other securing devices are adapted to be passed, thereby to permit the instrument to be mounted on a panel wall as aforesaid. In those instances where such instruments are to be used in unmounted fashion, as in small scale experimental laboratory installations, these apertured mounting flanges are exposed and unsightly.

It is the prime object of the present invention to devise a mounting system for instruments and the like which is not subject to the above drawbacks, but which instead provides for virtually the ultimate degree of flexibility in arrangement and mounting of instruments in such numbers and of such types as may be desired to form a panel assembly thereof, yet which uses standardized inexpensive components which may be manufactured on a mass production basis. It is a further prime object of the present invention to devise such a mounting system which will enable instruments to be used therein or to be used alone, and when used alone to have a finished and attractive appearance.

To these ends, the instruments designed to be used in the instant system are provided along the top and bottom edges of their front walls with upwardly extending shaped elements. Rails are provided designed to be located respectively above and below the top and bottom edges of the instrument front walls, those rails having recesses exposed along their length at the facing rail surfaces, said recesses being open at at least one end of the rails. The shaped elements on the instrument front walls are adapted to be slid into those recesses via the open ends thereof, thereby to secure the instrument, via its front wall, to the rails. The open ends of the rail recesses are closed by an end plate which is secured to the rails and therefore maintains the rails in spaced-apart condition. A simple support means may be provided, and the end plates are secured to that support means, preferably through appropriately located flanges on those end plates. Thus the instruments are mounted on the support means via the end plates, the rails, and the instrument elements received within the recesses in the rails. The rails may be formed of extruded metal or plastic, and may be provided with apertures open at the ends thereof which are adapted to receive the securing members carried by the end plates, thereby to secure the end plates to the rails. When the rails are longer than the combined lengths of the instruments whose upwardly and downwardly extending elements are received in the rail recesses, the empty spaces may be filled by auxiliary panel plates having upwardly and downwardly extending elements of the type carried by the instrument front walls, these auxiliary plate elements also being received in the rail recesses. While as a matter of practice the rails may be provided in pre-cut lengths, if those lengths do not correspond to a particular application they may be cut down to size. When an instrument is to be used alone, and not mounted in a panel arrangement, the elements extending upwardly and downwardly from its front wall may be received in rails having a length corresponding to the length of that front wall, end plates being secured to the ends of the rails to retain them in position on the instrument front wall, thereby to produce a finished, attractive, non-functional appearance to the front of the instrument.

To the accomplishment of the above, and to such other objects as may hereinafter appear, the present invention relates to an instrument mounting system as defined in the appended claims and as described in this specification, taken together with the accompanying drawings, in which:

FIG. 1 is a front elevational view of an exemplary instrument panel formed in accordance with the present invention, the panel arrangement being but typical of the many different arrangements which could be employed;

FIG. 2 is a fragmentary front elevational view of an enlarged scale of the framework of the panel assembly of FIG. 1, showing the support means, end plates and mounting rails in position, but with the instruments and the auxiliary panel walls removed;

FIG. 3 is a cross sectional view taken along the line 3—3 of FIG. 2 and showing the cross sectional shape of a typical mounting rail;

FIG. 4 is a cross sectional view taken along the line 4—4 of FIG. 2;

FIG. 5 is a fragmentary front elevational view of a typical instrument assembly front face wall;

FIG. 6 is a cross sectional view taken along the line 6—6 of FIG. 5;

FIG. 7 is a fragmentary three-quarter perspective view, partially in cross section, showing the manner in which an instrument front wall is mounted between a pair of mounting rails; and FIG. 8 is a three-quarter perspective view of an instrument arranged to be used in unmounted condition.

The system of the present invention has been specifically designed in connection with the manufacture of cathode ray oscilloscopes, and hence the instruments here specifically disclosed are all of that character, but it will be understood that this is by way of exemplification only, and that virtually any type of instrument, including both indicating instruments and control instruments, could be constructed and used in accordance with the present invention.

The instrument assemblies are generally designated A. In order to illustrate the flexibility of the system of the present invention, they are shown in three sizes, the instruments A in the lowermost four rows of FIG. 1 having a given height, the instruments A in the uppermost four rows having a lesser height, and the instruments A in the five intermediate rows having a still lesser height.

Each of the instruments A is provided with a front wall 2 at which, in the case of the cathode ray oscilloscopes here specifically disclosed, a cathode ray screen 4 and appropriate control knobs 6 are exposed. The functionally operative portion of the apparatus, such as the cathode ray tube 8 shown in FIG. 7 and the associated circuit elements (not shown), all of which may be enclosed within a casing 10 such as is disclosed in FIG. 8, are mounted on the rear side of the front wall 2. Extending up and down from the instrument front wall 2 and preferably (although not necessarily) extending continuously along the length thereof, are shaped elements generally designated 12, those elements comprising a neck portion 14 and an enlarged head portion 16, the head portion 16 being rectangularly shaped to one side of the neck portion 14 and on the other side of the neck portion 14 having a cross sectional shape which may be described as essentially that of a truncated triangle.

The mounting rails, generally designated 18, and the shape of which can perhaps best be seen from FIG. 3, comprise elongated structural members formed of metal or plastic and preferably fabricated in long lengths by an extrusion process. They comprise a main section 20 and a side section 22. The main section 20 has a substantially continuous surface 24 along one side thereof and has a recess 26 extending therealong, the cross sectional shape of the recess 26 corresponding to the cross sectional shape of the enlarged head portion 16 of the elements 12 extending from the instrument front walls 2. Another recess 28 extends the length of the rail 18 and communicates between the recess 26 and the rail surface 30 which is opposite the surface 24. The width of the recess 28 is less than that of the recess 26 but greater than that of the neck portion 14, and the height of the recess 28 is less than that of the neck portion 14. The side section 22 of the rail 18 is substantially C-shaped in cross section, thereby to define a recess 32 extending the length of the rail 18 and defining apertures open at the ends of the rails 18.

The mounting end plates generally designated 34 are substantially L-shaped in cross section, as may be seen from FIG. 4, and comprise wall portion 36 and outwardly extending flange 38. The mounting end plates 34 may also conveniently be formed of continuous stock, thereafter being cut to desired length, after which appropriate screw-receiving apertures 40 and 42 are formed in the wall portions 36 and flanges 38 respectively.

The support means, generally designated 44, is here shown as comprising uprights 46 of any desired structural material having feet or bottom supports 48. It may take many other forms, such as that of a wall. The support means 44 may be provided in a variety of heights, or may be provided in one long standard height, to be cut down by the user if a shorter height is desired.

When a particular instrument panel arrangement is decided upon, with the instruments A to be arranged in a plurality of horizontally extending rows positioned one above the other, all of the instruments A in a given row have the same height. This is virtually the only limitation placed upon the instrument arrangement in accordance with the present inevntion. The maximum width of the panel arrangement is determined. Then, for each row, a pair of mounting rails 18 having lengths equal to the width of the panel arrangement are selected, and a pair of mounting end plates 34 are selected which have a length corresponding to the height of that row. The rails are arranged so that their surfaces 30 face one another, one of the rails 18 thus becoming an upper rail and the other becoming a lower rail. The instruments A for a given row are then connected to the upper and lower rails 18 by sliding the upper and lower elements 12 carried by the instrument front wall 2 into the recesses 26, 28 of the upper and lower rails respectively via their open ends, the enlarged head portion 16 of the elements 12 sliding along the recess 26 and the narrower neck portion 14 of the elements 12 sliding along the recess 28. The instruments are positioned as desired, and the spaces between them are preferably filled by auxiliary panel plates 50, these plates having the same height as, and the same upwardly and downwardly extending elements 12 as, the instrument front walls 2, the widths of the auxiliary panel walls 50, and the number of such walls employed, being such as to substantially fill the spaces between the ends of the rails 18 which are not occupied by instrument front walls 2. An examination of FIG. 1 will show only a few of the virtually unlimited arrangements of instruments A and auxiliary panel walls 50 which can be made.

The open ends of the recesses 26, 28 are closed, thereby to prevent the instruments A and auxiliary panel walls 50 from sliding out therefrom, by the mounting end plates 34. The wall portions 36 of those plates 34 are placed against the ends of the upper and lower rails 18 with the apertures 40 in the end plate wall portions 36 registering with the apertures defined by the ends of the recesses 32 in the rails 18. Any suitable securing means, such as the screws 42, are passed through the apertures 40 and into the apertures defined by the ends of the recesses 32, those screws preferably having a self-threading characteristic in conjunction with the material of which the rail section 22 is formed. The C-shaped cross section of the rail section 22 serves to facilitate the self-threading action and to ensure a firm grip between the screws 52 and the material of the rails 18. The end plates 34 cover, and therefore close, the ends of the recesses 26, 28, and prevent the escape of instruments A or auxiliary panel walls 50. They also serve to retain the rails 18 in proper vertically spaced relationship. It will be understood, referring again to FIG. 1, that the height of the mounting end plates 34 used in the uppermost four rows is greater than that of the end plates 34 used in the next five lower rows, but is less than the height of the end plates 34 used in the lowermost four rows.

As each row assembly—consisting of a desired number and arrangement of instruments A and auxiliary panel walls 50, a pair of rails 18 and the associated end plates 34—is formed, it is secured to the uprights 46 of the support means 44 by causing the flanges 38 of the end plates 34 to overlap those uprights 46, after which screws 54 are passed through the apertures 42 in the flanges 38 and into the uprights 46.

It will be apparent that the number of rows, the height of each row, and the maximum length of the rows may be varied as desired, compensation for the varying widths of the instruments in each row being accomplished by selection of the appropriate widths for the auxiliary panels 50. The maximum length of the rows may be dictated by functional requirements (desired spacing between instruments or the need for a certain number of instruments side by side) or it may be dictated by extraneous factors (such as the existence in a fixed structure of uprights 46 having a given lateral spacing). Rails 18 of the desired length can readily be formed from extended length portions thereof by a simple cutting operation, and the shape of the rails 18 makes them readily adaptable to be manufactured by an extrusion process in virtually any desired length.

When an instrument is to be used individually and unmounted its appearance may be marred by the upwardly and downwardly extending elements 12. In order to produce an instrument having an attractive finish appearance, and as illustrated in FIG. 8, rails 18 may be provided for that instrument which have a length equal to the width of the instrument front wall 2. Associated with those rails 18 are a pair of finishing end plates 34' similar to end plates 34 but without the flanges 38. Screws 52 secure the finishing end plates 34' to the ends of the rails 18 and close the open ends of the rail recesses 26, 28. The thickness of the finishing end plates 34' may be less than the thickness of the mounting end plates 34, both for appearance purposes and because the finishing end plates 34' are not normally called upon to carry the weight of the instrument A.

While but a limited number of embodiments have been here specifically disclosed, it will be apparent that many variations may be made therein, all within the scope of the instant invention.

I claim:

1. In combination, an instrument assembly having a front face comprising a wall having shaped elements extending upwardly and downwardly from said assembly along the top and bottom edges thereof respectively; upper and lower mounting rails separate from said instrument assembly having recesses extending therealong substantially from one end to the other, said recesses being open at at least one end of said rails, exposed along their length at the facing surfaces of said upper and lower rails respectively, and shaped corresponding to said wall elements; said rails being spaced from one another with said wall between them and with said elements received in and slidable along said recesses; means for closing the ends of said recesses, said closing means comprising an end plate secured to said rails at corresponding ends thereof so as to space said rails from one another and overlying and therefore closing the corresponding ends of said recesses in said rails; support means separate from said instrument assembly; and means securing said end plate to said support means.

2. The combination of claim 1, in which said rails have apertures therein open at ends of said rails at positions spaced from the open ends of said recesses in said rails, said securing means comprising a securing member carried by said end plate and entering said aperture via the open end thereof.

3. The combination of claim 2, in which said end plate has a flange which extends out therefrom on the opposite side thereof from the rails secured thereto, said flange overlapping said support means, said end plate securing means engaging said flange and said support means and securing them to one another.

4. The combination of claim 2, in which said end plate has a flange which extends out therefrom on the opposite side thereof from the rails secured thereto, said flange overlapping said support means, said end plate securing means engaging said flange and said support means and securing them to one another, and in which said rails, in cross section, comprise a main section and a side section, said main section having said recesses therein, said recesses comprising a main portion spaced from the corresponding facing surface and a second portion narrower than said main portion extending to said facing surface, thereby to expose said recesses at said surface, said side section being substantially C-shaped in cross section, thereby to define said aperture open at said end of said rail.

5. The combination of claim 2, in which said end plate has a flange which extends out therefrom on the opposite side thereof from the rails secured thereto, said flange overlapping said support means, said end plate securing means engaging said flange and said support means and securing them to one another, and in which said rails have a length greater than the combined lengths of the front wall or walls of the instrument or instruments mounted therebetween, and auxiliary panel means having a height corresponding to that of said front face wall, having said shaped elements extending therefrom along the top and bottom edges thereof and slidably received within said rail recesses, and having a length corresponding to the difference between the length of said rails and the combined lengths of said instrument front wall or walls, whereby said auxiliary panel means and said instrument front wall or walls collectively substantially fill the space between said rails along the length thereof.

6. The combination of claim 2, in which said end plate has a flange which extends out therefrom on the opposite side thereof from the rails secured thereto, said flange overlapping said support means, said end plate securing means engaging said flange and said support means and securing them to one another, in which said rails have a length greater than the combined lengths of the front wall or walls of the instrument or instruments mounted therebetween, and auxiliary panel means having a height corresponding to that of said front face wall, having said shaped elements extending therefrom along the top and bottom edges thereof and slidably received within said rail recesses, and having a length corresponding to the difference between the length of said rails and the combined lengths of said instrument front wall or walls, whereby said auxiliary panel means and said instrument front wall or walls collectively substantially fill the space between said rails along the length thereof, and in which said rails, in cross section, comprise a main section and a side section, said main section having said recesses therein, said recesses comprising a main portion spaced from the corresponding facing surface and a second portion narrower than said main portion extending to said facing surface, thereby to expose said recesses at said surface, said side section being substantially C-shaped in cross section, thereby to define said aperture open at said end of said rail.

7. The combination of claim 2, in which said shaped elements comprise a narrow neck and an enlarged head, said recesses having a cross sectional shape corresponding to said heads and opening to said facing surfaces respectively by way of openings narrower than said recesses but larger in width and shorter in height than said necks, and in which said end plate has a flange which extends out therefrom on the opposite side thereof from the rails secured thereto, said flange overlapping said support means, said end plate securing means engaging said flange and said support means and securing them to one another.

8. The combination of claim 2, in which said shaped elements comprise a narrow neck and an enlarged head, said recesses having a cross sectional shape corresponding to said heads and opening to said facing surfaces respectively by way of openings narrower than said recesses but larger in width and shorter in height than said necks, in which said end plate has a flange which extends out therefrom on the opposite side thereof from the rails secured thereto, said flange overlapping said support means, said end plate securing means engaging said flange and said support means and securing them to one another, and in which said rails have a length greater than the combined lengths of the front wall or walls of the instrument or instruments mounted therebetween, and auxiliary panel means having a height corresponding to that of said front face wall, having said shaped elements extending therefrom along the top and bottom edges thereof and slidably received within said rail recesses, and having a length corresponding to the difference between the length of said rails and the combined lengths of said instrument front wall or walls, whereby said auxiliary panel means and said instrument front wall or walls collectively substantially fill the space between said rails along the length thereof.

9. The combination of claim 2, in which said shaped elements comprise a narrow neck and an enlarged head, said recesses having a cross sectional shape corresponding to said heads and opening to said facing surfaces respectively by way of openings narrower than said recesses but larger in width and shorter in height than said necks, in which said end plate has a flange which extends out therefrom on the opposite side thereof from the rails secured thereto, said flange overlapping said support means, said end plate securing means engaging said flange and said support means and securing them to one another, in which said rails have a length greater than the combined lengths of the front wall or walls of the instrument or instruments mounted therebetween, and auxiliary panel means having a height corresponding to that of said front face wall, having said shaped elements extending therefrom along the top and bottom edges thereof and slidably received within said rail recesses, and having a length corresponding to the difference between the length of said rails and the combined lengths of said instrument front wall or walls, whereby said auxiliary panel means and said instrument front wall or walls collectively substantially fill the space between said rails along the length thereof, and in which said rails, in cross section, comprise a main section and a side section, said main section having said recesses therein, said recesses comprising a main portion spaced from the corresponding facing surface and a second portion narrower than said main portion extending to said facing surface, thereby to expose said recesses at said surface, said side section being substantially C-shaped in cross section, thereby to define said aperture open at said end of said rail.

10. The combination of claim 1, in which said end plate has a flange which extends out therefrom on the opposite side thereof from the rails secured thereto, said flange overlapping said support means, said end plate securing means engaging said flange and said support means and securing them to one another.

11. The combination of claim 10, in which said rails have a length greater than the combined lengths of the front wall or walls of the instrument or instruments mounted therebetween, and auxiliary panel means having a height corresponding to that of said front face wall, having said shaped elements extending therefrom along the top and bottom edges thereof and slidably received within said rail recesses, and having a length corresponding to the difference between the length of said rails and the combined lengths of said instrument front wall or walls, whereby said auxiliary panel means and said instrument front wall or walls collectively substantially fill the space between said rails along the length thereof.

12. The combination of claim 10, in which said rails have a length greater than the combined lengths of the front wall or walls of the instrument or instruments mounted therebetween, and auxiliary panel means having a height corresponding to that of said front face wall, having said shaped elements extending therefrom along the top and bottom edges thereof and slidably received within said rail recesses, and having a length corresponding to the difference between the length of said rails and the combined lengths of said instrument front wall or walls, whereby said auxiliary panel means and said instrument front wall or walls collectively substantially fill the space between said rails along the length thereof, and in which said shaped elements comprise a narrow neck and an enlarged head, said recesses having a cross sectional shape corresponding to said heads and opening to said facing surfaces respectively by way of openings narrower than said recesses but larger in width and shorter in height than said necks.

13. The combination of claim 10, in which said shaped elements comprise a narrow neck and an enlarged head, said recesses having a cross sectional shape corresponding to said heads and opening to said facing surfaces respectively by way of openings narrower than said recesses but larger in width and shorter in height than said necks.

14. The combination of claim 1, in which said rails have a length greater than the combined lengths of the front wall or walls of the instrument or instruments mounted therebetween, and auxiliary panel means having a height corresponding to that of said front face wall, having said shaped elements extending therefrom along the top and bottom edges thereof and slidably received within said rail recesses, and having a length corresponding to the difference between the length of said rails and the combined lengths of said instrument front wall or walls, whereby said auxiliary panel means and said instrument front wall or walls collectively substantially fill the space between said rails along the length thereof.

References Cited

UNITED STATES PATENTS

| | | | |
|---|---|---|---|
| 3,035,446 | 5/1962 | Ross | 248—27 X |
| 3,159,436 | 12/1964 | Davis | 312—107 |
| 3,286,133 | 11/1966 | Sturdivan | 312—108 X |
| 3,288,319 | 11/1966 | Cahill | 312—108 X |

FOREIGN PATENTS

| | | |
|---|---|---|
| 774,829 | 5/1957 | Great Britain. |

CHANCELLOR E. HARRIS, Primary Examiner

U.S. Cl. X.R.

211—26; 248—27; 312—7, 111